United States Patent [19]

Grosse-Boes

[11] Patent Number: 5,028,115
[45] Date of Patent: Jul. 2, 1991

[54] CONNECTOR FOR AN OPTICAL WAVEGUIDE

[75] Inventor: Hans G. Grosse-Boes, Pulheim-Sinnersdorf, Fed. Rep. of Germany

[73] Assignee: U.S. Philips Corp., New York, N.Y.

[21] Appl. No.: 524,256

[22] Filed: May 15, 1990

[30] Foreign Application Priority Data

May 31, 1989 [DE] Fed. Rep. of Germany ....... 3917664

[51] Int. Cl.$^5$ .............................................. G02B 6/36
[52] U.S. Cl. ............................. 350/96.20; 350/96.21
[58] Field of Search ............... 350/96.20, 96.21, 96.22, 350/96.23

[56] References Cited

U.S. PATENT DOCUMENTS

| | | | |
|---|---|---|---|
| 4,687,292 | 8/1987 | Krausse ...................... | 350/96.20 X |
| 4,884,864 | 12/1989 | Ellis et al. ..................... | 350/96.21 |
| 4,926,647 | 2/1988 | Kakii et al. ..................... | 350/96.21 |
| 4,938,558 | 7/1990 | Miller et al. ..................... | 350/96.21 |
| 4,941,728 | 7/1990 | Pautz et al. ..................... | 350/96.21 |

FOREIGN PATENT DOCUMENTS 0086266  8/1983  European Pat. Off. .

*Primary Examiner*—John D. Lee
*Assistant Examiner*—Phan T. Heartney
*Attorney, Agent, or Firm*—Ernestine C. Bartlett

[57] ABSTRACT

The invention relates to a connector for an optical waveguide which is inserted capable of sliding into a wire sleeve (4), comprising a housing (1) in which a connector element (9) accommodating the LWG (6) is arranged with radial play and capable of axial movement against the action of a spring (12), the optical waveguide (6) being freely inserted into a slide space formed between the connector element (9) and a rear wall of the housing (1) and permitting the axial sliding motion. Kinks in the LWG and additional attenuations are prevented in that the LWG is surrounded in the slide space by a sleeve which is arranged in the slide space in such a manner that it is radially and axially movable relative to the LWG. In accordance with a further solution it is provided that the LWG (6) is directly surrounded in the slide space by a helical spring (12a) whose initial and end turns (17, 19) are so connected to elements (2, 9) of the connector which are axially slidable relative to each other, that the inner diameters of the initial or end turns (17, 19), respectively, are approximately equal to the diameters of the holes (18, 20) in the elements (2, 9) of the connector through which the LWG (6) is passed.

8 Claims, 1 Drawing Sheet

CONNECTOR FOR AN OPTICAL WAVEGUIDE

FIELD OF THE INVENTION

The invention relates to a connector for an optical waveguide which is inserted capable of sliding into a wire sleeve, comprising a housing in which a connector element accommodating the light waveguide (LWG) is arranged capable of axial movement against the action of a spring, the optical waveguide being freely inserted into a slide space formed between the connector element and a rear wall of the housing and permitting the axial sliding motion.

BACKGROUND OF THE INVENTION

In a connector of this type, for example as disclosed in the EP-A 86266, it was found that, when the connector element is slid back, as occurs when it is inserted in a coupling member the LWG can be curved to a very high extent or even be kinked. The LWG is then not fed back into the wire sleeve in the desired manner, so that curved regions remain in the connector.

SUMMARY OF THE INVENTION

The invention has for its object the provision of such an embodiment of the connector of the type defined in the opening paragraph wherein kinking of the LWG and/or bends producing additional attenuations are avoided.

In a first preferred embodiment of the invention, the LWG is enveloped in the slide space by a sleeve which is arranged in the slide space in such a manner that it is radially and axially movable relative to the LWG.

The sleeve prevents radii of curvature of the LWG which are too small and enables angle differences, between the direction in which the axis of the LWG extends in the rear portion of the converter housing and in the connector member, with a uniform slight curvature over a long path, to be absorbed even when a shearing force is exerted on the LWG during the rearward slide of the connector member.

In an embodiment of the type described for example in EP-A 86266, in which the spring surrounds the slide space as a helical spring, the outer dimension of the sleeve must be less than the inner diameter of the helical spring, to ensure the radial travel of the sleeve in the slide space.

These relative motions are made possible because the inner diameter of the sleeve exceeds the outer diameter of the preferably LWG the inner diameter of the sleeve is more than 1.5 and less than 3 times the outer diameter of the LWG. Obviously, the sleeve must only be of such a length that the axial motion of the connector member is possible to the desired extent.

In a particularly preferred embodiment, the connector member has a drilled hole in which the LWG is inserted with radial play, and which has a diameter that is less than the inner diameter of the sleeve. Additionally, the inner diameter of the sleeve may be less than the inner diameter of a hole provided in the rear portion of the connector housing and in which the LWG is accommodated with radial play. It has been found that an increase in the cross-section of the sleeve surrounding the LWG in the connector member towards the rear end of the connector enables a particularly smooth re-insertion of the LWG in its sleeve which is connected to the connector. To this end, it has furthermore been found to be very advantageous for the sleeve to consist of at least two partial sleeves which are movable relative to each other.

In an alternative embodiment of the invention, the LWG is directly surrounded in the slide space by a helical spring whose initial and end turns are provided in such a manner of mutually axially slidable members of the connector that the inner diameter of the initial and end turns are approximately equal to the diameters of the holes in the members of the connector through which the LWG is to be inserted. In this situation the helical spring which tightly fits around the embodiment discussed above. LWG performs the function of the sleeve provided in the first solution. Preferably a helical spring is of a conical shape and is formed such that its inner diameter tapers inwardly towards the connector member.

BRIEF DESCRIPTION OF THE DRAWING

The invention will now be described in greater detail with reference to the drawing.

DETAILED DESCRIPTION OF THE PREFERRED EMBODIMENTS

Figure 1:
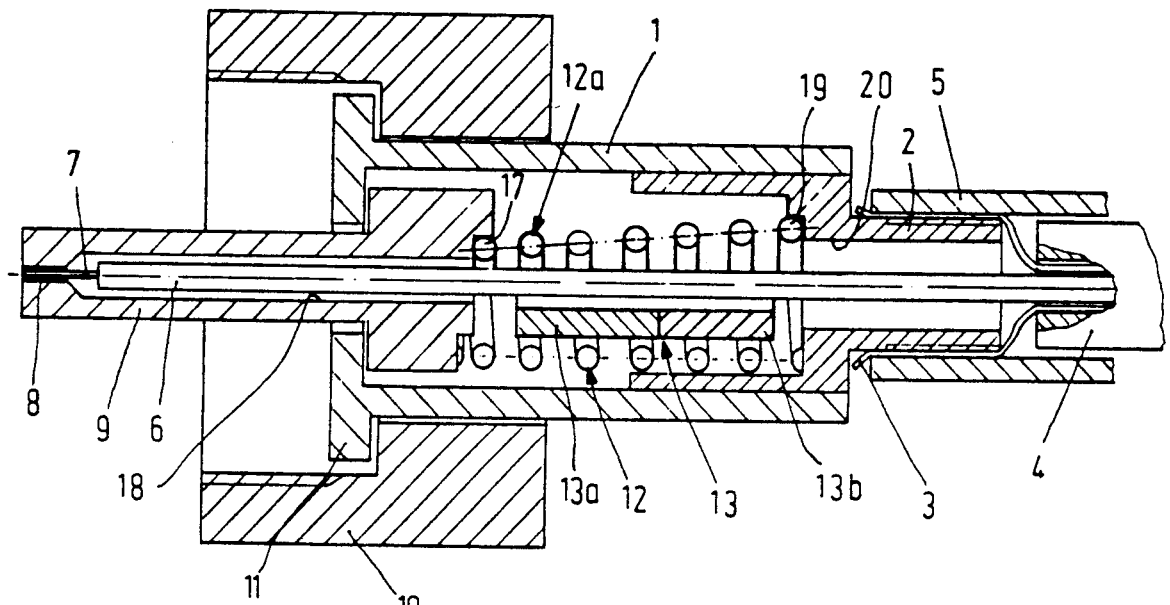
FIG. 1 is a cross-sectional view through a connector which is shown schematically and not to scale, two alternative embodiments of the invention being shown.

Rigidly connected to the housing 1 of the connector shown in FIG. 1 is a tensile stress-absorbing attachment 2 to which tensile stress relief members 3 of a sleeve 4 (which surrounds the LWG 6 capable of sliding) are secured in known manner by means of a crimp sleeve 5.

In the terminal area 7 the secondary coating is removed at least from the LWG 6 and is there centrically cemented in a hole 8 in which a connector member 9 can be accommodated. On coupling the connector shown, the connector member 9 is inserted in a coupling sleeve, not shown, as far as to the stop on a mating connector member. In this situation, the connector 3 is forced in a pick-up hole in the coupling sleeve and must consequently be so disposed in the housing 1 of the connector shown in FIG. 1 that it is capable of radial movement. When the connector is coupled by means of the coupling ring 10 to the coupling sleeve, the connector member 9 is pushed into the connector by the stop ring 11 of the housing 1 against the force of a helical spring 12. The LWG must then be pushed back into its sleeve 4. This requires thrust forces which may deflect the LWG with curvature in the free space within the connector. On the one hand, the sleeve 13 which, in accordance with a first embodiment of the present invention, is arranged so that it is capable of free radial and also axial motion between the LWG 6 and the helical spring 12 permits a desired curvature of the LWG 6 when the connector member 9 is deflected at an angle during the coupling procedure. On the other hand, the sleeve 13 prevents excessively sharp curves or even kinking of the LWG 6. Kinks, especially when they frequently occur, can result in a rupture of the LWG 6, so that the operating life of the connector is reduced.

Undesirably small radii of curvature, which may also remain after the coupling procedure in the connector member, may result in increased attenuations. As a result of the sleeve 13, which is added in accordance with the invention, only smooth curves can occur. After coupling of the connector to a coupling sleeve, the LWG 6 can easily slide back into the sleeve 4, so that ultimately it extends again within the connector substantially free from curvatures. This advantageous effect of the sleeve 13 is increased by the fact that it consists of two partial sleeves 13a and 13b which can be moved relative to each other.

The upper part of FIG. 1 shows a further embodiment of the invention, in which no sleeve 13 is required. Its function and advantageous effect is rather achieved by a special shape of the helical spring 12a which tightly surrounds the LWG 6. The inner diameter of the initial turn 17 is approximately equal to the diameter of the hole 18 in the connector member 9. The inner diameter of the final turn 19 is adapted in a corresponding manner to the diameter of the hole 20 of the tensile stress-absorbing attachment 2. As the diameter of the hole 20 in the embodiment exceeds the diameter of the bore 18, the coiled spring 12a tapers. Preferably only very slight tapers occur. Tapering may be totally dispensed with, if desired.

Figure 2:
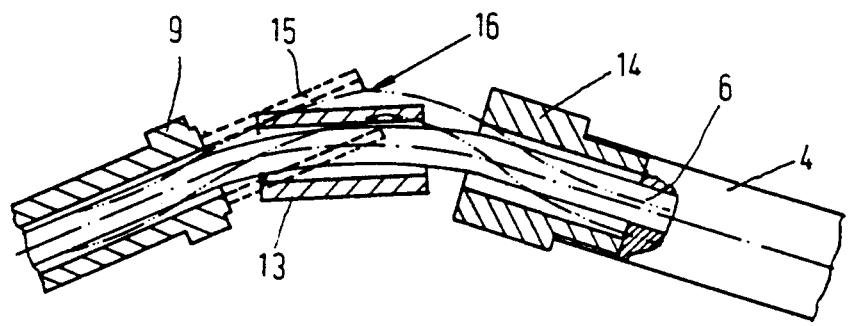
FIG. 2 shows the variation in the curvature of the LWG in the slide space for an embodiment having a sleeve in accordance with the invention, compared to a prior-art construction.

FIG. 2 shows the curvature of LWG 6 for the connector member 9 and a housing portion 14 which face each other inclined through an angle. A softer curvature is obtained in the sleeve 13 provided in accordance with the invention. A more acute curvature of the LWG 6 as denoted by the dot-and-dash line occurs when a sleeve attachment 15, shown by a broken line, is rigidly secured to the connector member 9. A significant risk of kinking then occurs more specifically at the final edges of the sleeve attachment 15 in the location 16.

In the embodiment of FIG. 1 the inner diameter of the sleeve 13 is preferably twice as large as the outer diameter of the LWG 6. It is furthermore selected to exceed the diameter of the hole 18, which movably accommodates the LWG 6, of the connector member 9. Differences in diameter from 0.2 0.3 mm are especially preferred. The diameter of the hole 20 of the tensile stress-absorbing attachment 2 at the end of the connector is increased to the same extent relative to the inner diameter of the sleeve 13.

I claim:

1. A connector for an optical waveguide (LWG) which is inserted capable of sliding into a wire sleeve (4), said connector comprising a housing (1) in which a connector element (9) accommodating the LWG (6) is arranged capable of axial movement against the action of a spring (12), the LWG (6) being freely inserted into a slide space formed between the connector element (9) and a rear wall of the housing (1) and permitting the axial sliding motion, the LWG (6) being enveloped in the slide space by a sleeve (13) which is so arranged in the slide space that it is radially and axially movable relative to the LWG (6).

2. A connector as claimed in claim 1, wherein the sleeve (13) is arranged radially movable within a helical spring (12) the inner diameter of said spring (12) exceeding the outer diameter of the sleeve (13).

3. A connector as claimed in claim 1, wherein the inner diameter of the sleeve (13) is more than 1.5 and less than 3 times the outer diameter of the LWG (6).

4. A connector as claimed in claim 1 wherein the connector element (9) has a hole in which the LWG (6) is inserted with radial play, the diameter of said holes being less than the inner diameter of the sleeve.

5. A connector as claimed in claim 1, wherein the inner diameter of the sleeve (13) is less than the inner diameter of a hole (20) which is provided in the rear portion of the connector housing (1) and surrounds the LWG (6) with radial play.

6. A connector as claimed in claim 1, wherein the sleeve (13) consists of at least two facing movable partial sleeves (13a, 13b).

7. A connector for an optical waveguide which is inserted capable of sliding into a wire sleeve (4), within which a connector element comprising elements (2, 9) which are axially slidable relative to each other and having holes (18, 20) for accommodating the LWG (6), the connector element being arranged with radial play and, being axially movable relative to a helical spring (12a) surrounding the LWG (6), the LWG (6) being freely inserted into a slide space between the connector element (9) and a rear wall of the housing (1) which allows the axial slide feature, the LWG (6) also being directly surrounded in the slide space by a helical spring (12a), the initial and end turns (17, 19) of said spring being so connected to said axially slidable elements (2, 9) of the connector that the inner diameters of said initial and end turns (17, 19), respectively, are approximately equal to the diameters of the holes (18, 20) of the connector through which the LWG (6) is to be inserted.

8. A connector as claimed in claim 7, wherein the helical spring (12a) is of a conical shape and has a diameter which tapers inwardly towards the connector element (9).

* * * * *